United States Patent Office 3,732,153
Patented May 8, 1973

3,732,153
ELECTROCHEMICAL APPARATUS AND PROCESS FOR THE MANUFACTURE OF HALATES
Cyril J. Harke, Burnaby, and John C. Parkinson, North Vancouver, British Columbia, Canada, and John E. Currey, Lewiston, N.Y., assignors to Hooker Chemical Corporation, Niagara Falls, N.Y.
Filed Oct. 5, 1971, Ser. No. 186,749
Int. Cl. C01b *11/26;* B01k *3/00, 3/04*
U.S. Cl. 204—95
20 Claims

ABSTRACT OF THE DISCLOSURE

An electrochemical apparatus for the manufacture of halates, e.g., sodium chlorate, includes an electrolytic cell having monopolar dimensionally stable anodes held to and removable from the cell at a side thereof, and cathodes, ducts for conducting hypohalite and gaseous electrolysis products upwardly through the cell and baffled means for conducting the hypohalite downwardly to a bottom portion of the cell, from which it may be drawn off as chlorate, or recycled, the baffled means for returning the hypohalite and other electrolyte constituents downwardly being such that the hypohalite will be held for a long enough time so as to become substantially converted to chlorate. In preferred aspects of the invention, the dimensionally stable monopolar anodes are of platinum, platinum-iridium alloy or ruthenium oxide over a valve metal such as titanium, tantalum or niobium, internal cooling of the electrodes is provided, conductors are copper rods clad with titanium, which also serve to rigidify the anodes, the cell top is of a fiberglass-reinforced plastic, replenished electrolyte is continually added to the cell, the anodes and cathodes are held apart by spacing lines of electrolyte-resistant plastic, which may be fastened together around a pair of cathode surfaces, and at least two such electrochemical apparatuses are electrically joined by copper connectors of a construction which minimizes thermal expansion-contraction strains on the electrodes.

---

This invention relates to an improved apparatus for electrolyzing metal halide solutions to metal hydroxide, halogen and hydrogen, reacting the metal hydroxide and halogen to form a metal hypohalite and converting the hypohalite to metal halate and halide. More particularly, the invention is of such an apparatus and the process in which it is utilized wherein dimensionally stable anode structures are employed in a particular anode side-entry design, in conjunction with means for in-cell conversion of hypohalite to halate, certain types of spacers between the anodes and cathodes, and improved electrical connectors between cells.

Since the advent of dimensionally stable anodes, such as those made from valve metals, e.g., titanium, coated on their active electrolytic surfaces with a noble metal or a noble metal oxide or equivalent, e.g., platinum, 70–30 platinum-iridium, various electrolytic cell designs and processes have been suggested wherein such anodes would replace previously employed carbon anodes, as in diaphragm cells for the production of chlorine and caustic. A significant advantage of the new anodes in such applications is in their dimensional stability. Whereas graphite electrodes were eroded or oxidized so that clearances varied over the lives of the electrodes and whereas they had to be replaced fairly frequently, e.g., every six months to one year, better control of current density, electrode gap and the electrochemical reactions is obtainable with the dimensionally stable anodes. In some patents and publications it was suggested that these anodes could also be employed in the production of alkali metal halates, such as sodium chlorate, from aqueous solutions of halides. Applicants have found that, utilizing their apparatus, an unexpectedly beneficial advantage is obtained in that the production of halates can be effected entirely inside electrolytic cell apparatuses, spacings of anodes and cathodes are maintained accurately throughout the lives of the cells and openings of the cells to replace anodes are not needed except every two to five years. Earlier cleanouts are not necessary because of the absences of carbon anodes and diaphragms. As was mentioned before, the carbon anodes become consumed at uneven rates, and the diaphragms often become blocked. In the case of the diaphragm cell production of halogens and caustic, the diaphragms require frequent renewal, as do carbon anodes, such is usually effected when the anodes are replaced.

The present invention provides an efficient and economical apparatus for halate production from halide solutions. The anodes and cathodes are maintained aligned and do not short-circuit or abrade one another. The side entry of the anodes permits savings in copper connectors and bus bars, since they do not have to pass the extra distance to a position underneath the cells. Heat exchange means in various parts of the cells, including the anodes, and cell tops, if desired, allow regulation of the temperatures of the electrolyte and solutions undergoing reactions, so as to permit use of the best operating temperatures and protect cell components from excessive temperatures. Installation and removal of anodes and cathodes, although not required frequently, may be effected simply and without causing damage to the electrodes. Parts of the structure which have important functions also frequently serve secondary functions, e.g., reinforcement, aligning, insulating and protecting. The apparatuses require little maintenance or supervision and function continuously with only minor changes in controls being effected periodically.

The invention will be readily understood by reference to the previous and following descriptions and the accompanying illustrative drawing, in which FIG. 1 is a partially cutaway and sectional side elevation of the electrochemical cell apparatus of this invention;

In this description of an illustrative apparatus of the invention, reference will be made to the production of sodium chlorate from an aqueous solution of sodium chloride, although it is clear that this is for the purpose of simplicity of description, since it is possible to make other halates, e.g., sodium bromate and potassium iodate, by methods like those herein described. Also, it is to be kept in mind that various equivalent structures may be substituted for those mentioned and replacements may be made which will be apparent to one skilled in the art to which this invention pertains.

Figure 2:
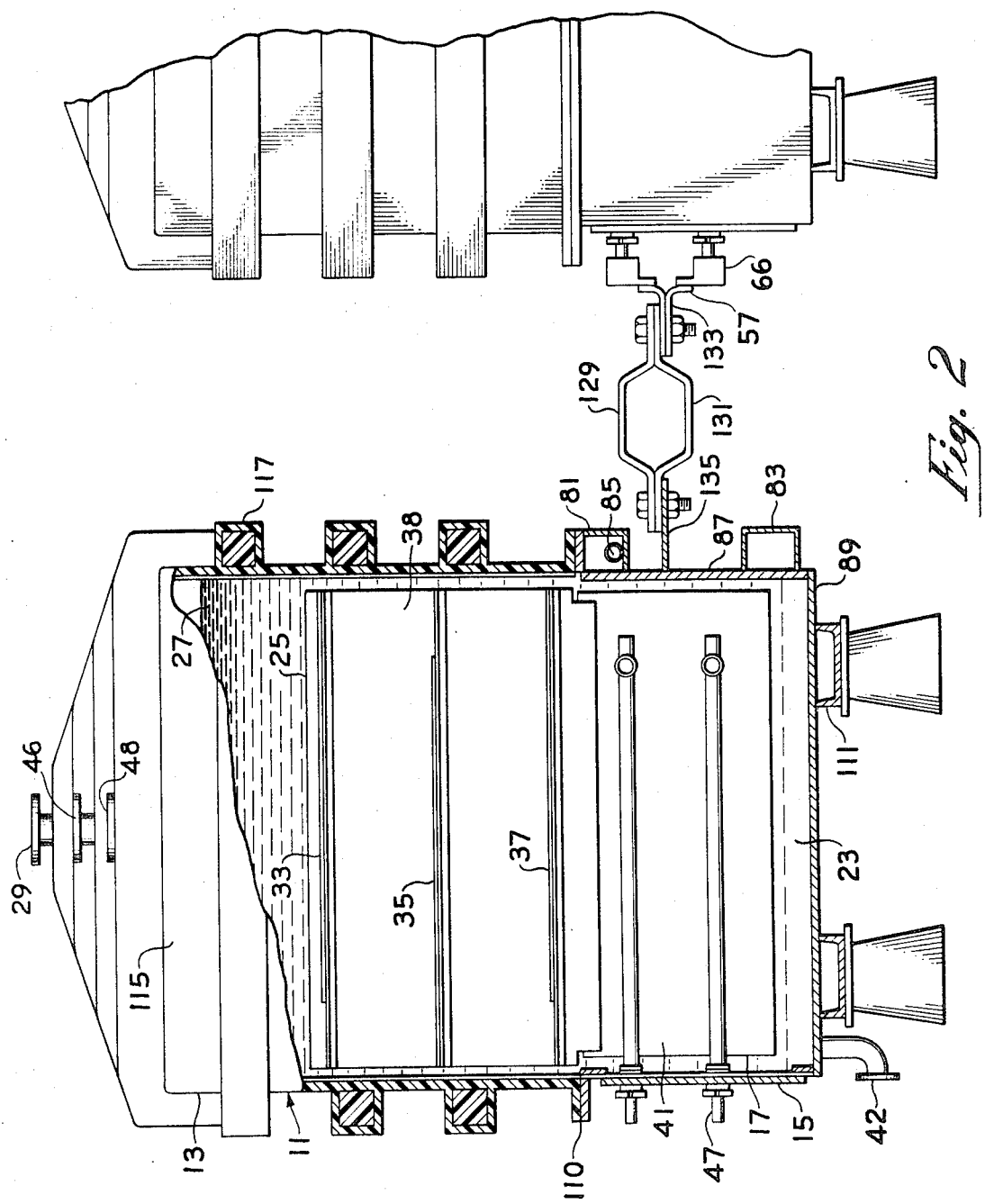
FIG. 2 is a partially cutaway and sectional end elevation of the electrochemical cell apparatus of FIG. 1, showing electrical connection thereof to another such cell.
Figure 4:
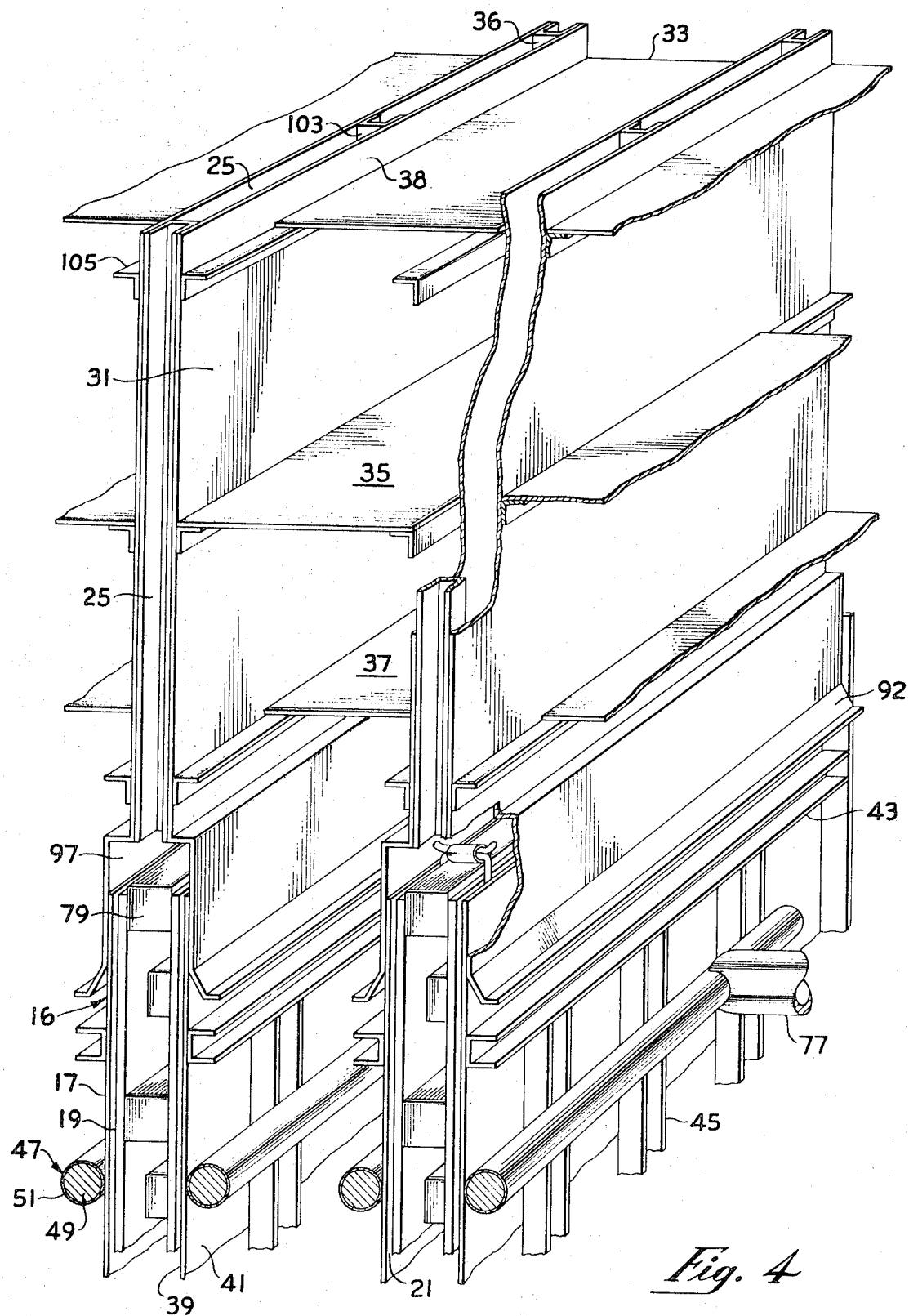
FIG. 4 is a modified perspective view of part of a pair of anode-cathode assemblies, showing the ducts or passageways for upward flow of reaction products and the baffled downward path followed by the product during recycling.
Figure 5:
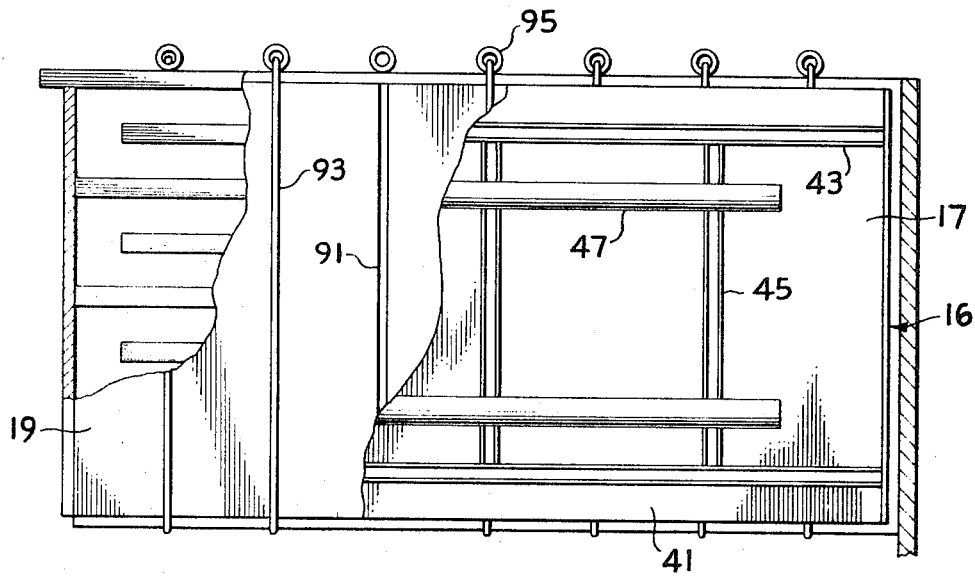
FIG. 5 is an enlarged partially cutaway end view of the anode-cathode assembly, showing the inactive side of the anode, the spacers and cathode surface and the cathode interior.
Figure 6:
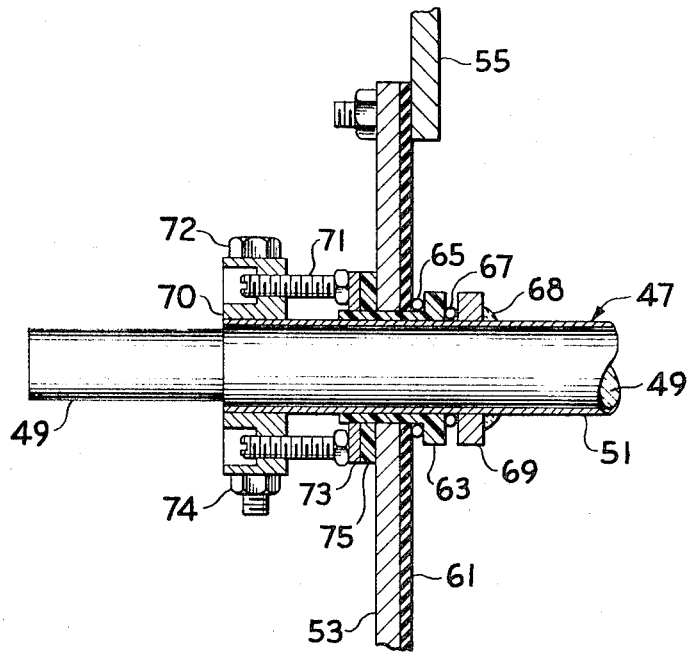
FIG. 6 is an enlarged sectional end elevation of the means for fastening the anode conductor and side plate in insulated and electrolyte-tight positioned relationship with the cell box.

Electrolytic or electrochemical cell 11 may be considered to be comprised of two sections, a top portion 13, for retention of the hypochlorite and conversion to chlorate, and a bottom or electrolytic portion 15 wherein sodium chloride and water are electrolyzed between the active electrode surfaces and wherein hypochlorite is converted to chlorate in the larger spaces between the inactive electrode surfaces. In the bottom portion, in the "active electrolytic" portion of which the electrolytic reaction of sodium chloride and water to produce sodium hydroxide, chlorine and hydrogen takes place and in which the chlorine and sodium hydroxide react at least partially to produce sodium hypochlorite, the main electrolytic structures 16 are composed of anodes 17 and cathodes 19. The electrically active faces of the anodes and cathode are separated by a small clearance 21 in which there is present electrolyte 23, a substantially saturated aqueous solution of sodium chloride, usually containing sodium chlorate along with sodium hypochlorite between the electrodes and in the riser passageways. The chloride is converted by direct electric current to sodium hydroxide, chloride and hydrogen. The density of the mixture of the gas and liquid is lower than that of electrolyte liquid in other sections of the cell and therefore, the electrolyzed material moves upwardly through riser passageway or duct 25 and into a top head space or volume 27, from which gas, almost entirely hydrogen, is removed at opening 29, with the liquid then descending through passageways or ducts 31, which are baffled at 33, 35, and 37, the baffles being staggered, as shown in FIGS. 2 and 4. Although three baffles are illustrated for each section of the cell between electrode groupings, other numbers of baffles, from three to eleven or more, may be employed usefully. If desired, additional baffles can be included in the portions of the cells between the anodes. The baffles prevent short circuits or direct dropping of hypochlorite solution to the cell bottom and increase the reaction time availble for conversion of hypochlorite solution to chlorate. The baffles may also furnish a means for contacting and regulating the temperature of the hypochlorite solution, as with heated baffle or partition walls 36 or heating means, not illustrated, which may be located in the upper portion of the cell. In a similar manner, the ducts or riser passages 25, which may be bounded by two walled rigidifying and stabilizing members 38, aid in promoting the contact of chlorine with sodium hydroxide to favor the formation of sodium hypochlorite and also, some sodium chlorate. Of course, they also separate the upgoing liquid from the liquid moving downwardly.

The chlorate solution drops through the enlarged space 40 (electrochemically inactive) between the anode backs and a fraction thereof may be removed through an outlet 42. Material not withdrawn is allowed to remain in the cell and the chlorate concentration thereof is increased further by having a portion flow between the electrodes to produce more hypochlorite and ultimately, the chlorate concentration can be increased substantially. Makeup feed, usually a saturated aqueous solution of sodium chloride, is added directly to the cell or to a recycle stream, which is added to the electrolyte through spaced nozzles 46 and 48 at the cell top or, in some cases, through a bottom inlet, not shown.

The anode construction is a comparatively easily manufactured one, being primarily a valve metal, often in sheet form, coated with a noble metal, with the anode being reinforced by channels and/or angles and having a conductor of positive electric potential joined to it, which also helps to rigidify the anode. Instead of the solid sheet anodes, perforated metals, expanded metals and screens may also be employed. Numeral 41 represents the valve metal side of the anode 17 and 39 designates the noble metal or noble metal oxide plating or coating on the active side thereof. The anode is strengthened and held flat by horizontal and vertical channels 43 and 45, respectively, of titanium. Titanium-clad conductor rods 47 extend horizontally and carry a positive electrical potential to the anode. As noted, the titanium cladding 51 surrounds the copper core 49. The strengthening members may be welded, e.g., spot welded, brazed, or otherwise joined to the titanium of the anode base, as at 50 and 52, and to the conductor rods, as at 54 and 56. Similarly, the rods may be held to the anodes, as at 58 and 60. As is seen in FIGS. 6, 1, 2 and 3, pairs of anodes are joined by conductor bars or rods 47 to cover means 53 for fastening them in place on the side 55 of the electrochemical cell. An electrical connector 57 external to the cell connects to a source of electricity, and is held in a tight fit against the copper core of he conductor rod, from which titanium cladding has been removed or on which it was never placed. The conductors illustrated are shown as solid rods and the angles and channels reinforcing the anodes are also solid. Yet, if desired, cooling water or other heat transfer fluid may be circulated through such members to help regulate electrolysis temperatures and conditions.

Figure 1:
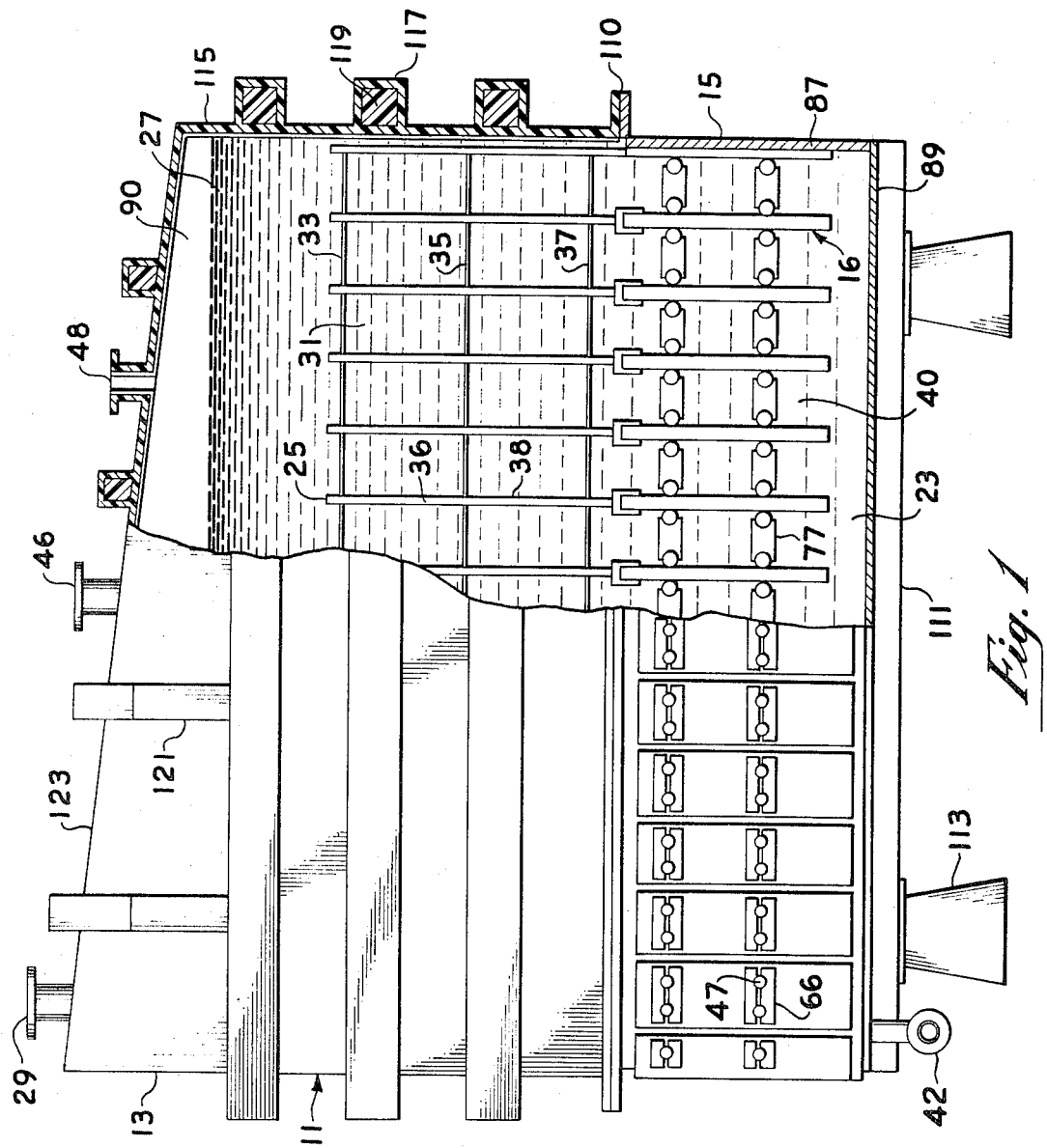

As is seen from FIG. 1 spacing electrical connectors 66 are each clamped onto a pair of conducting rods 47 and two such conductors are utilized for each anode, one above the other. Thus, the anodes are positioned about the cathodes and electricity is conducted to near the tops and bottoms of the anodes for best distribution effects and minimized losses due to resistances. Cover means or plate 53 has a gasket 61 held tightly to it over its entire surface by a suitable adhesive, e.g., ABS cement, to prevent any chemical contact and electrolytic action on the inside of the plate, and to make the contact of the cover plate and the cell wall electrolyte-tight and insulated. Additionally, to prevent leakage and electrical shorting past the conductor rods or tubes 47, suitable synthetic organic plastic, e.g., polytetrafluoroethylene or other heat resistant plastic, flanged collars 63 are provided, in conjunction with O-rings 65 and 67 and a titanium collar 69 fastened tightly to the titanium-clad rod 47 by welds at 68. By turning jackscrews 71, which are threaded through a base or stable member 70, held to conductor 47 by screws and nuts 72 and 74, and which jackscrews bear against steel or other rigid members 73, force is transmitted through insulators 75 to the cover plate 53 and it presses the O-rings against the sides of collars 63 and 69 and gasket 61, thereby preventing leakage of electrolyte and shorting out of the cell. The O-rings are of Viton A or silicone rubber, or other suitable plastic. They are made to close tolerances and hence, give good seals in the described applications without too great a distortion of the desirably accurately fitted anode parts. By tightening of screws 71, the anode connector rods 47 are tightly positioned with respect to cover means 53 and are held properly in the cell at the entry side. As is indicated in FIGS. 1 and 2, at the other end of the anode, at the side of the cell away from the entry side, are provided PVDC or CPVC (after chlorinated PVC) spacers 77 to maintain the correct distances between the anode connector bars and thereby position the anode exactly, pressing them against polytetrafluoroethylene (Teflon) spacers which will be described later. Of course, such spacers may also be made of other suitable electrolyte-resistant materials shaped to fit the connector rods or tubes.

The cathode sub-assemblies include two active cathodes held together. As is shown best in FIGS. 3 and 4, the cathodes 19, usually of iron or an alloy such as steel or stainless steel, are held together by being welded or otherwise fastened about spacer bars 79, which are staggered so as to provide passageways for cooling water or other coolant to be circulated through the cathode sub-assemblies, moving from bottom to top thereof in generally horizontal paths. In FIG. 2 are shown top and bottom headers 81 and 83 and outlet pipe 85 from header 81, through which the cooling water or other heat exchange medium is transported to the cathode sub-assembly interior. The cathode assemblies are fastened in place to the side wall of the cell opposite that through which the anode assemblies are inserted and withdrawn. Fastening of the cathodes to the metal (preferably steel) wall 87 of the cell box portion 89, all of which may be considered a part of the cathode, may be effected by any suitable means, including welding, bolting, etc.

Figure 3:
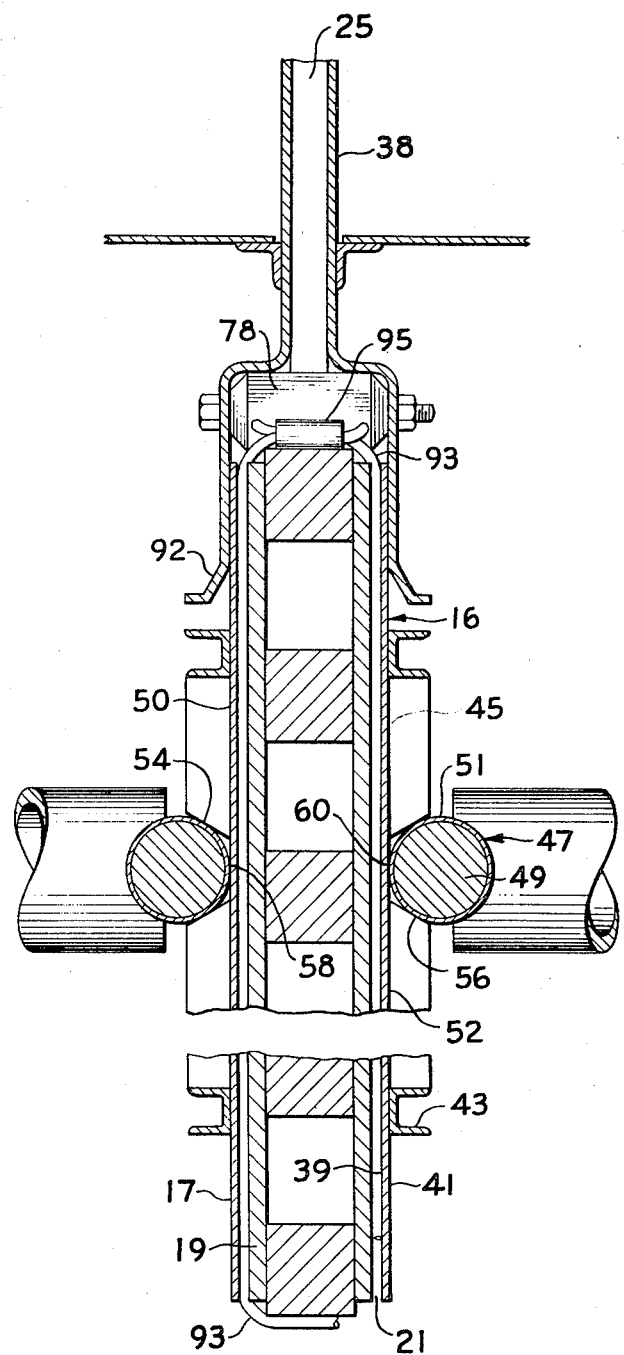
FIG. 3 is an enlarged view of portions of the anode-cathode assembly of FIG. 1.

To maintain the desired gap 21 between the active anode and cathode surfaces, grooves 91 are provided in the cathode and suitable synthetic organic polymeric spacer lines or cords 93, preferably of polytetrafluoroethylene, are fitted in them and passed about the cathode sub-assembly before insertion of the anode into the cell. The lines may be tied, preferably at the top of the cathode sub-assembly or may be fused together, crimped or otherwise suitably held. As illustrated in FIGS. 3 and 4, the Teflon lines are tightly pulled together through a crimpable sleeve 95, which is then distorted to hold them in place, after which they are fused together by the application of heat (or they may be heated first and then crimped). The Teflon lines project the desired distance outside the grooves to correctly space the cathode active surfaces from the anodes and give proper clearances 21. They also protect the platinum, platinum-iridium or other noble metal coatings on the titanium anodes from being damaged by scratching against the cathode surfaces when the anodes are being installed or removed, since the lines act as bearing surfaces and guides. They serve to divide clearance spaces 21 into individual vertically directed passages, thereby preferentially bringing electrolyte into those sections where the electrolysis might be proceeding at a more rapid rate, since it is those areas in which the gases generated serve to lift the hypochlorite solution most rapidly through the electrolytic spaces. The Teflon lines also prevent shorting out of the cell. It is important that the clearance spaces between anode and cathode are not below a certain minimum, e.g., 1/32 inch, but it is not as important that the clearance be below a maximum, e.g., 1/8 in. Usually, however, the range will be held to from 1/32 in. to 3/32 in., preferably from 1/32 in. to 1/16 in. The positioning of the conductor bars by fastening to member 53 and spacing the opposite ends apart with spacers 77 will limit the maximum clearances. Often, the effect of the enclosure and spacers will be to hold the anodes tightly against the plastic lines positioned on the cathode sub-assemblies, thereby maintaining an exact and optimum clearance. Chamfered hollow cylindrical supporting spacers and insulators 78, held by bolts 109, serve to maintain the designed distance between the cathodes assembly top and the riser passageway structure, also preventing shorting of the electrodes. A preferred material of construction of the spacers is Trovidur HT (PVDC).

During electrolysis, a mixture of sodium hypochlorite, sodium hydroxide, chlorine, and hydrogen is produced in the electrolytic spaces, between electrodes. The gases cause the solution to be lighter than a gas-free solution and therefore, it rises to an electrode head chamber section 97 above the electrodes from which it passes through walled riser passageways 25 into an upper space 27, from which the gases move into a head space 90, from which they are withdrawn through outlet 29, usually containing less than 0.5% of chlorine. The riser walls 38 are preferably made of titanium although in some instances electrolyte-resistant plastic may be employed. Dividing channel 103 maintains the risers in position and helps furnish a support for angles 105 on which baffles 33, 35 and 37 rest or are joined. The Trovidur or polyvinylidene chloride spacer 78, is not shown in FIG. 4 so that the clarity of representation of the structure of the electrodes may be maintained.

The electrolytic portion of the cell, bottom section 15 is essentially a steel walled box 89 which acts as a cathode. At one end of the row of electrode sub-assemblies, an anode may be associated with the cathodic wall of the cell to conduct electrolysis there and at the other end, only a single anode-cathode pair may be present. Of course, the structure of the risers for such part-cells are modified over those specifically illustrated in the drawings but it is not considered to be necessary to show such modifications in detail because they represent only a minor proportion of the electrolytic effects and their operation is essentially the same as for the cell sections already illustrated. The cell bottom is held to the top by an appropriate electrolyte-tight, flanged connection, illustrated at 110. The entire cell is supported by channel members 111 resting on concrete piers 113.

The cell top 13 is made of a fiberglass-reinforced polyester resin or other suitable plastic, preferably of the type sold as Hetron (based on chlorendic acid), which is lined with an electrolyte-resistance plastic, e.g., Trovidur HT. The resin and plastic are resistant to chemical attack and are fire retardant. The resin is also of sufficiently great strength to hold the volume of electrolyte in the cell and withstand the pressure generated by it, at various operating temperatures. The Hetron walls 115 are reinforced with integral or molded-in channels 117 about them, which channels are filled with a polyester or polyether foam material such as Hetrofoam (also a polymeric based on chlorendic acid). Instead of molding the parts with the walls, they may be cemented on. The foam filling adds strength and little weight and aids in maintaining the shape of the reinforcing channels. As will be noted, such channels are primarily horizontal although vertical units may also be employed, as at 121. The cell ceiling 123 slopes toward one end, allowing for more economical construction, easier cleaning and better visibility of parts thereof.

Because of the great accuracy demanded in the positioning of the anodes and cathodes, cell distortions due to strains occurring during heating and cooling are to be avoided. One source of distortion in the use of electrolytic cells arises from the expansion and contraction of the electricity-carrying bus bars. Experimentation has established that a bar of the design shown will not unduly strain the walls of the cell and prevents distortion of the electrode relationships, despite the side to side bus bar connections. Thus, where a bus bar conducts electricity from the cathodes of one cell to the anodes of the next, the flat anode member is bowed symmetrically and oppositely, as at 129 and 131. Even though it is bolted tightly to anode and cathode connectors 133 and 135, expansion and contraction will be taken up by movement of bow portions 129 and 131 and will not be transmitted to the cells or the electrodes thereof.

Another feature of the invention is the easy assembly and disassembly of the anode groups, without, damage. Although this is largely due to Teflon line spacers, it is also attributable to the upper guide means 92 between which and the cathode sub-assembly the anode sub-assembly may be passed during assembly. The guide also acts as a deflector to direct descending electrolyte away from impingement on the anode reinforcing channels 43 and promotes smoother flow.

In the operation, the cell is charged with sodium chloride solution at the desired concentration (usually saturated), cooling water is circulated through the cathodes and through the anode conductors or channels, if desired, and the current is turned on. In the diaphragmless space between the anode and the cathode, sodium hydroxide, chlorine and hydrogen are generated and the sodium hydroxide and chlorine react to produce sodium hypochlorite. The hydrogen and the aqueous sodium hypochlorite rise past the electrodes, through the riser passageways or ducts and to near the top of the cell, from which the hydrogen may be withdrawn, wtih the sodium hypochlorite solution, at first only dilute, being returned downwardly past the baffles and between the electrode sub-assemblies to the bottom of the cell. After sufficient circulation of electrolyte past the electrodes, the concentration of sodium chlorate produced from the hypochlorite is high enough to allow for withdrawal of some solution as product. A portion of the amount withdrawn is mixed with saturated sodium chloride solution or is resaturated by addition of NaCl crystals, acidified with HCl or chlorine or a mixture thereof, heated or cooled, as desired (usually cooling is effected), and is returned to the cell near the top or bottom thereof. The process is operated continuously in such manner. In other embodiments of the invention the sodium chloride and acid are added directly to the electrolyte cell and no chlorate removed from the cell is returned to it. Under preferred conditions of operation, the current density is maintained at 4 to 6 amperes per square inch but may be considerably higher, the voltage is about 3 to 5 volts and the gap between anodes and cathodes is from $\frac{1}{32}$ to $\frac{1}{8}$ inch. The concentration of sodium chloride in the aqueous electrolyte solution will be from 100 to 150 grams per liter and the concentrations of sodium chlorate will be from 300 to 520 grams/liter. The pH of the electrolyte will be maintained at about 6 to 6.5 by the addition of hydrochloric acid or chlorine to the returning electrolyte so that the electrolyte returned has a pH of about 4 to 5. Current efficiencies obtained are about 95%.

The following example illustrates the operation of the present apparatus in producing sodium chlorate. Such a method is only illustrative and the invention may be employed for making other metal halates. In the example and in the specification all parts are by weight and all temperatures are in ° C. unless otherwise indicated.

EXAMPLE

Into an electrolytic cell of the type described in FIGS. 1–6, measuring approximately four feet by eight feet and being about eight feet high, equipped with platinum- or platinum-iridium plated titanium anodes and stainless steel cathodes, with the cell box being of soft steel and the cell top being of Trovidur HT-lined Hetron polyester resin, there is charged a sufficient quantity of aqueous sodium chloride solution to fill the cell to a distance about six inches from the lower end of the cell top. The Hetron resin is preferably glass fiber reinforced and is fire retardant. The Trovidur HT is a chlorinated polyvinyl chloride that is substantially free of plasticizers and is suitable for high temperature applications. The preferred coating used on the titanium anodes is a 70–30 platinum-iridium composition. The baffles, walls, conductors, insulators, separators and other parts are of the designs and materials described in the specification for the preferred embodiments of the invention and are of the preferred dimensions given, adapted for a cell of the mentioned size.

A brine solution containing 310 grams per lite of NaCl is circulated through the cell as a startup feed and subsequently is used as makeup feed. The inlet temperature of the brine is about ambient, from 15° to 30° C., but it is soon heated up to cell operating temperature, which is such that the liquor drawn off from the cell is at about 70° C. Chlorine gas is fed in with the makeup brine or with the recirculated electrolyte to acidify the liquor entering the electrolytic zone. Acidification is to the extent that the takeoff liquor has a pH of 6.1.

After circulation of electrolyte is begun and the cell is started in operation the cell voltage is controlled so as to be at 4.12 volts, with a current density of 4 amperes per square inch. When the circulating electrolyte shows an increase to a content of sodium chlorate of 420 g.p.l., liquor is taken off from that circulating and is made up with feed brine. Takeoff and makeup are continuous. The liquor removed analyzes 135 g.p.l. of NaCl, 420 g.p.l. of NaClO$_3$ and 2.4 g.p.l. NaOCl. Gas removed from the cell top portion of the apparatus, which contains from 1 to 4 times the volume of the active bottom section, analyzes 1.6% chlorine and 3.0% oxygen but it is considered that chlorine content can be reduced to less than 0.5% under best operations. Generally, the gas will contain less than 2.0% of chlorine.

Operations of the cell are continued and feeds and takeoffs are regulated so as to maintain the electrolytic equilibrium and permit takeoff of the cell liquor at the analysis indicated. Under such operating conditions it is found that the cell efficiency is about 95% or better. The various component parts of the cell withstand the operating conditions and the chemicals with which they come into contact so well that repairs and replacements are not necessitated for periods of over a year.

Similarly, operations at the other conditions described in the foregoing specification and operations at the conditions of this example modified as indicated in the specification, result in efficient production of sodium and other metal chlorates.

The invention has been described with respect to various illustrations and examples thereof but is not to be considered as limited to these because it will be clear to one skilled in the art that equivalents and substitutes may be employed without departing from the spirit of the invention or going outside its scope.

What is claimed is:

1. An apparatus for the manufacture of a halate which comprises an electrolytic cell having means for positioning a plurality of monopolar dimensionally stable anodes and cathodes in spaced relationship with one another, said anodes being held to the cell at a side thereof and being removable from the cell through said side, means for applying positive and negative electric potentials to the anodes and cathodes, respectively, means for holding a halide electrolyte in the cell so that it conducts current between the anodes and cathodes and is at least partially electrolyzed thereby to hypohalite and gaseous electrolysis product, means for conducting the hypohalite and gaseous electrolysis product upwardly between anodes and cathodes through the cell, means for withdrawing a gaseous product of electrolysis from the top of the cell, means for conducting hypohalite downwardly past baffles to a bottom portion of the cell, said means holding said hypohalite for a long enough period of time before reaching the cell bottom so as to convert it to halate, means for withdrawing halate-containing liquor from the cell after it has descended through the baffled passageway, and means for feeding halide to the cell to replace that which was consumed in the preparation of withdrawn halate.

2. An apparatus according to claim 1 wherein the dimensionally stable monopolar anodes are of platinum, platinum-iridium alloy or ruthenium oxide on the active surfaces thereof over a valve metal selected from the group consisting of titanium, tantalum and niobium, substantially in short form and substantially vertically positioned in the electrolytic cell, electricity is conducted to the anodes by a conductive metal selected from the group consisting of copper, aluminum and iron, covered with titanium and the anodes are rigidified by a plurality of channels and/or angles of titanium or titanium clad metal.

3. An apparatus according to claim 2 wherein the anodes are of platinum-iridium alloy on the active surface thereof over a titanium sheet base, the electric current is carried to the anodes by a plurality of copper parts clad with titanium, rigidification of the anodes is at least partially effected by a plurality of channels and/or angles of titanium held to nonactive surfaces of each of the anodes, to which the titanium covered conductors are also held, the anodes are fastened to the side of the electrolytic cell by insulating connections to plates held to the cell, which plates help to maintain the desired positions of the anodes with respect to the cathodes and through which plates positive electric potential is transmitted to the anodes by the titanium-clad copper parts, and the anodes are spaced apart at ends opposite to the said side by spacers between the opposite ends of the titanium covered conductors.

4. An apparatus according to claim 3 wherein the connections of the anodes to the cell wall are by means of a cover plate fastened to the cell wall in liquid tight contact, to close off an opening in the cell wall, with holes in the cover plate through which anode connectors pass, said anode connectors being tubes or rods of conducting material, a collar on each anode connector, held firmly thereto and positioned in the interior of the cell when the anodes are assembled in the cell, a plurality of sealing O-rings, insulating and electrolyte-resistant synthetic organic plastic sealing means for compressing the electrolyte-resistant synthetic organic plastic O-rings between the collar and said sealing means and between the means and the cover plate interior wall or a coating or gasket thereon, and means for tightening the O-rings against the collar and the sealing means and against the sealing means and cover plate interior or coating or gasket thereon and to insulate the anode connector from the cover plate of the electrolytic cell and to prevent leakage of the electrolyte through the cover plate.

5. An apparatus according to claim 2 wherein the anode connectors are so positioned as to rigidify the anodes and are hollow and fastened to an insulated source of cooling water so as to cool the anodes during operation and thereby promote more efficient electrolysis.

6. An apparatus according to claim 3 wherein the cathodes are hollow and are formed from metal sheets, each having an active surface facing an anode and separated from the anodes by plastic spacers, said cathodes being assembled to have two active sheet faces sandwiching rigidifying internal spacers which are staggered therein to provide for the internal flow of coolant through the cathode to promote more efficient electrolysis.

7. An apparatus according to claim 6 wherein the cathodes are of iron or mild steel, the internal baffles are of mild steel, the cathodes have grooves therein on the active sides thereof facing the anodes, the plastic spacers are flexible polytetrafluoroethylene lines which are passed through the spaces and are in the grooves, beyond which they project a desired distance against the anodes to position the anodes and cathodes with respect to each other, and the two ends of each of said lines are tied, crimped, fused or otherwise held together to hold them tightly in place.

8. An apparatus according to claim 1 wherein collecting riser passages or ducts are located above pairs of anode-cathode electrolytic cell portions and carry mixtures of hypohalite and gaseous reaction products of the electrolysis of halide and metal hydroxide, by gas flow, upwardly, promoting further action of halogen and metal hydroxide to form hypohalite and aiding in the producing halates, said ducts terminate in a head space from the top of which a gas outlet permits the exit of gaseous material, and a plurality of staggered baffles allows the products of electrolysis, carried upwardly to the head space by the rising gas, to descend between the riser passages to the electrolytic portion of the electrolytic cell, during which passage through the baffled portions of the cell hypohalite is converted to halate.

9. An apparatus according to claim 8 wherein the riser passages are walled with polytetrafluoroethylene, titanium or polyvinyl chloride (PVDC) and extend substantially vertically, the staggered baffles are in sheet form and extend substantially horizontally, there are at least three such baffles for each passageway in which electrolyzed liquor moves downwardly to the electrode portion of the cell, said baffles are so located as to be rigidified by the walls of the riser passages and to help position said walls and hold them in place about the riser passages, and about the baffles and head space there is a fiberglass-reinforced polyester top, lined with polyvinyl chloride (PVDC), through which top passes the exit for the gaseous electrolytic product, hydrogen.

10. An apparatus according to claim 9 wherein the riser duct walls are of titanium, the fiberglass-reinforced polyester resin is of a chlorendic acid or chlorendic anhydride resin made by the reaction of such acid or anhydride with a condensation product of a higher aliphatic acid or ether and a lower alkylene diol or polyol, the top is of a gross volume about 1 to 4 times that of the electrode portion of the cell, the riser passage walls are of titanium and the baffles are of titanium sheet.

11. An apparatus according to claim 2 in which the means for holding electrolyte is a steel tank which is part of the cathode structure of the cell, in combination with an electrolyte-resistant plastic top of fiberglass-reinforced polyester resin, said top being constructed with integral fiberglass-reinforced polyester resin ribs projecting outwardly from it in a substantially horizontal direction so as to strengthen it against the pressure of contained electrolyte, and said top and tank being flanged and held together in electrolyte-tight engagement with a synthetic plastic or elastomeric spacing gasket to prevent leakage between the flanges.

12. An apparatus for the manufacture of a halate which comprises an electrolytic cell having means for positioning a plurality of monopolar dimensionally stable anodes and cathodes in spaced relationship with one another, said anodes being held to the cell at a side thereof and being removable from the cell through said side, means for transmitting positive and negative electric potentials to the anodes and cathodes, respectively, means for holding a halide electrolyte solution in the cell so that it conducts a current between the anodes and cathodes and is at least partially electrolyzed thereby to halogen, metal hydroxide and hydrogen, of which the halogen and hydroxide react to make hypohalite, halide and water, clearance means and passageway means for conducting the hypohalite and gaseous electrolysis product(s) upwardly between the anodes and cathodes and through the cell, means for removing hydrogen at the top of the cell, and a plurality of baffled passageways, matched with passageways through which the at least partially electrolyzed product is elevated, for conducting hyponalite solution downwardly to a bottom portion of the cell, while retaining it for a long enough period of time to convert it to halate, said baffled passageways including titanium walls which are also walls for the passages for conducting the electrolysis product upwardly and which strengthen the baffles, means for withdrawing halate-containing liquor from the cell after it has descended through the baffled passageways, and means for feeding halide to the cell to replace that consumed in the preparation of halate.

13. An apparatus for the manufacture of soduim chlorate which comprises an electrolytic cell having means for positioning a purality of anodes and cathodes therein, means for transmitting positive and negative electric potentials to the anodes and cathodes, respectively, means for holding an aqueous sodium chloride solution electrolyte in the cells so that it conducts current between the anodes and cathodes and is at least partially electrolyzed thereby to sodium hydroxide, chlorine and hydrogen, which are therein reacted to produce sodium hypochlorite and gaseous hydrogen, means for conducting the sodium hypochlorite and hydrogen upwardly through the cell and away from the electrodes, thereof, means for withdrawing hydrogen at the cell top, and, inside the cell body, a plurality of baffles for conducting hypochlorite solution, less removed hydrogen, downwardly to a bottom portion of the cell by at least an S-route and at such a speed that the sodium hypochlorite is converted to sodium chlorate, sodium chloride and water, means for withdrawing sodium chlorate-containing solution from the cell after it has descended through the baffled passageway and means for feeding sodium chloride to the cell to replace that part consumed in the preparation of sodium chlorate.

14. An apparatus according to claim 13 wherein the means for conducting the sodium hypochlorite solution and hydrogen upwardly through the cell and away from the electrodes includes pluralities of passageways aligned with the electrodes and extending substantially across the width of the cell and each of which contains a plurality of passages separated by a reinforcing separating and spacing member, so that the hydrogen evolved in the electrolysis carries the sodium hydroxide, chlorine and hypochlorite formed at or near related electrode portions upwardly through the tubes, thereby promoting contacts and further reaction between the chlorine and sodium hydroxide.

15. An apparatus for the manufacture of a halate which comprises an electrolytic cell having means for positioning a plurality of monopolar dimensionally stable anodes and cathodes in spaced relationship with one another, said anodes being held to the cell at a side thereof and being removable from the cell through such side, means for transmitting positive and negative electric potentials to the anodes and cathodes, respectively, means for holding a halide electrolyte in the cell so that it conducts current between the anodes and cathodes and is at least partially electrolyzed thereby to hypohalite and gaseous electrolysis product, and means for withdrawing hatate-containing liquor from the cell, the means for spacing the anodes and cathodes being a plurality of polytetrafluoroethylene lines which are held between the cathodes and anodes in such manner that they pass around a two-faced cathode in which the faces are substantially parallel to and opposite one another, and between the faces of such cathode and adjacent anodes, so that the clearance between electrodes is regulated by the thickness of the lines.

16. An apparatus for the manufacture of sodium chlorate which comprises an electrolytic cell having a plurality of anodes and cathodes positioned in substantially parallel arrangement and, spacing the anodes from the cathodes, a plurality of electrolyte-resistant plastic lines tied, crimped or fused together.

17. A plurality of cells according to claim 1, arranged in series fashion in a horizontal plane with the anodes and cathodes thereof extending and the electrical connections extending the same direction as the cell series with bus bars connecting with anodes of the next cell and to a similar cathode therein.

18. A plurality of cells arranged in series fashion in a horizontal plane, according to claim 17, wherein the electrical connections between the cells include double-bowed copper strips, bowed about a horizontal axis which is at a right angle to the direction of connection between the cells and bowed similarly in opposite directions so as to define closed curved or polygonal shapes so that the bows "absorb" expansion and contraction forces on the cells and connectors and help to maintain dimensional integrity of the cells.

19. A method of electrolyzing a sodium chloride solution to chlorine, hydrogen and sodium hydroxide and then converting this to sodium hypochlorite and then to sodium chlorate, which comprises passing direct current between a plurality of monopolar dimensionally stable anodes and a plurality of related cathodes at a current density of from 4 to 6 amperes per square inch at a voltage of from 3 to 5 volts while controlling the gap between anodes and cathodes to be from $\frac{1}{32}$ to $\frac{1}{8}$ inch and the concentration of sodium chloride in aqueous electrolyte solution from 10 to 15 grams per hundred milliliters, removing products of electrolysis, including gas-entrained electrolyte, from the area of the electrodes and moving it by a gravity flow differential force upwardly through walled passageways of electrolyte resistant material to the top of a baffled return section of the electrolytic cell, removing from the cell hydrogen gas containing less than 2.0% of chlorine, returning to the bottom of the cell, by means of a tortuous or baffled route, the balance of the electrolyte, in which passage hypochlorite is converted to chlorate, withdrawing electrolyte containing chlorate at the bottom of the cell, to which it was returned from the baffled area and adding substantially saturated aqueous soduim chloride solution or sodium chloride crystals to the cell to compensate for the materials removed from the cell.

20. A method for installing and removing monopolar dimensionally stable anodes from an electrolytic cell which comprises applying lines of electrolyte-resistant synthetic organic plastic about pairs of cathode surfaces, against which the anodes fit, and installing or removing the anodes between the cathodes, whereby contacts are prevented between anode and cathode surfaces and contacts of the anodes are with the synthetic organic plastic pieces.

References Cited

UNITED STATES PATENTS

| | | | |
|---|---|---|---|
| 3,553,088 | 1/1971 | Grotheer et al. | 204—95 |
| 3,574,095 | 4/1971 | Westerlund | 204—236 |
| 3,657,102 | 4/1972 | Keith | 204—290 F |
| 3,475,313 | 10/1969 | Westerlund | 204—234 |
| 3,291,714 | 12/1966 | Hall et al. | 204—256 |

FOREIGN PATENTS

| | | | |
|---|---|---|---|
| 1,284,779 | 1/1962 | France | 204—270 |

FREDERICK C. EDMUNDSON, Primary Examiner

U.S. Cl. X.R.

204—267, 269, 270